US008540204B2

(12) United States Patent
Hernandez (10) Patent No.: US 8,540,204 B2
(45) Date of Patent: Sep. 24, 2013

(54) METHOD FOR SERVICING A TURBINE ENGINE COVER PLATE ASSEMBLY

(75) Inventor: Alberto M. Alvarez Hernandez, Boca Raton, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/462,035

(22) Filed: May 24, 2012

(65) Prior Publication Data
US 2013/0219716 A1 Aug. 29, 2013

Related U.S. Application Data

(62) Division of application No. 12/203,197, filed on Sep. 3, 2008, now Pat. No. 8,177,186.

(51) Int. Cl.
*F16M 13/00* (2006.01)

(52) U.S. Cl.
USPC .............. 248/555; 248/676; 248/912; 269/37

(58) Field of Classification Search
USPC ................ 248/554, 555, 556, 557, 639, 671, 248/676, 512, 519, 524, 176.1, 346.03, 907, 248/912; 73/112.01, 116.03; 414/680; 269/9, 269/37, 45, 902
See application file for complete search history.

(56) References Cited

U.S. PATENT DOCUMENTS

| | | | |
|---|---|---|---|
| 1,024,860 A * | 4/1912 | Kline | 254/106 |
| 2,409,326 A * | 10/1946 | Wargo | 248/146 |
| 2,602,615 A * | 7/1952 | Maynard et al. | 248/676 |
| 2,862,683 A * | 12/1958 | Dunagan et al. | 248/147 |
| 2,885,165 A * | 5/1959 | Smolen | 248/671 |
| 3,169,367 A * | 2/1965 | Hussey | 60/39.37 |
| 3,279,619 A * | 10/1966 | Alissandratos | 211/85.19 |
| 3,306,464 A * | 2/1967 | Rogers | 211/78 |
| 3,696,938 A * | 10/1972 | Sherman | 211/78 |
| 3,765,667 A * | 10/1973 | Christiansen | 269/59 |
| 4,066,172 A * | 1/1978 | Howard | 211/78 |
| 4,099,634 A * | 7/1978 | McIntire et al. | 414/560 |
| 4,134,562 A * | 1/1979 | Paakkinen et al. | 248/639 |
| 4,138,079 A * | 2/1979 | Ehret et al. | 248/558 |
| 4,200,273 A * | 4/1980 | Das Gupta et al. | 269/61 |
| 4,202,539 A * | 5/1980 | Polastri et al. | 269/70 |
| 4,239,196 A * | 12/1980 | Hanger | 269/17 |
| 4,406,366 A * | 9/1983 | Forshee | 206/319 |
| 4,770,304 A * | 9/1988 | Woods | 212/348 |
| 4,771,980 A * | 9/1988 | Dubbs et al. | 248/662 |
| 4,848,717 A * | 7/1989 | Bevill | 248/670 |
| 5,192,047 A * | 3/1993 | Lisi et al. | 248/676 |
| 5,213,294 A * | 5/1993 | DeBord | 248/147 |
| 5,238,126 A * | 8/1993 | Rindoks | 211/85.8 |
| 5,354,023 A * | 10/1994 | Meeks | 248/129 |
| 5,358,227 A * | 10/1994 | Bennett et al. | 269/68 |
| 5,456,434 A * | 10/1995 | Lomauro | 248/176.3 |
| 5,586,743 A * | 12/1996 | Sodolak | 248/671 |
| 5,681,033 A * | 10/1997 | Bullen | 269/71 |
| 5,785,457 A * | 7/1998 | Thompson et al. | 405/172 |

(Continued)

*Primary Examiner* — Bradley Duckworth (57) ABSTRACT

A holding structure associated with a lifting device for supporting a removed turbine engine cover plate assembly. The holding structure includes an upper support member and a lower support member. The upper support member is formed with a plurality of service areas, where each service area is configured for servicing a cover plate assembly. Each service area includes a plurality of slots extending inwardly from a peripheral edge of the upper support member to receive and support components of the cover plate assembly during a disassembly and service operation.

8 Claims, 8 Drawing Sheets

(56) References Cited

U.S. PATENT DOCUMENTS

| | | | |
|---|---|---|---|
| 5,857,660 A * | 1/1999 | Lentine | 248/640 |
| 5,934,626 A * | 8/1999 | Collins, Jr. | 248/132 |
| 6,047,491 A * | 4/2000 | De Busk | 43/21.2 |
| 6,254,055 B1 * | 7/2001 | Lamberson, Jr. | 248/538 |
| 6,729,597 B2 * | 5/2004 | Cholinski et al. | 248/646 |
| 6,763,965 B2 * | 7/2004 | Parenteau | 220/263 |
| 6,848,260 B2 * | 2/2005 | North et al. | 60/737 |
| 7,676,983 B2 * | 3/2010 | Jenkins | 43/21.2 |
| 7,735,363 B2 * | 6/2010 | Mainville | 73/116.03 |
| 7,861,579 B2 * | 1/2011 | Mainville | 73/112.01 |
| 2004/0206859 A1 * | 10/2004 | Chong et al. | 248/121 |
| 2009/0294625 A1 * | 12/2009 | Fernley et al. | 248/671 |

* cited by examiner

METHOD FOR SERVICING A TURBINE ENGINE COVER PLATE ASSEMBLY

CROSS REFERENCE TO RELATED APPLICATIONS

This is a divisional application of U.S. patent application Ser. No. 12/203,197, filed Sep. 3, 2008 now U.S. Pat. No. 8,177,186.

FIELD OF THE INVENTION

The present invention relates to a cover plate assembly stand, and more particularly, to a stand for supporting one or more cover plate assemblies of a turbine engine during service of the assemblies.

BACKGROUND OF THE INVENTION

Typical combustion turbine engines may include up to 16 cover plate assemblies, which are generally large in size and can weigh up to about 1000 pounds. A combustion turbine engine cover plate assembly generally comprises a cover plate, a pilot nozzle, a support housing or fuel nozzle, and a basket. The cover plate holds the pilot nozzle, support housing, and basket in place and is attached to the engine. The pilot nozzle and main fuel nozzles of the support housing cooperate to introduce a fuel, such as natural gas, into the combustion section of the engine where the fuel is ignited. The basket functions to change the flow of the air and fuel mixture from a turbulently flowing fluid to a laminar flowing fluid after it has been ignited, thus allowing a smooth transition of the air and fuel mixture into the turbine section of the engine.

It may be necessary to remove one or more cover plate assemblies for servicing, such as to repair, replace, or inspect the components of the cover plate assembly. Prior art methods of servicing a cover plate assembly may involve multiple technicians working together to manipulate and remove the cover plate assembly. Once the cover plate assembly is removed, it can be set down, such as on the ground and serviced. Certain services to the cover plate assembly involve manual lifting of the heavy components of the cover plate assembly by the technicians. These prior art methods may cause injury to the technician, as manipulating the large cover plate assembly and the heavy components thereof can be difficult and demanding on the human body. Further, if the cover plate assembly is damaged during the servicing, the cover plate assembly may need to be repaired or replaced, both of which can be expensive and time consuming and would be preferably avoided to the extent possible.

SUMMARY OF THE INVENTION

In accordance with a first aspect of the present invention, a holding structure is provided for supporting a removed turbine engine cover plate assembly. The cover plate assembly comprises a cover plate having an inner side, an outer side, a C-stage ring extending from the inner side and a central aperture extending between the inner and outer sides. The cover plate assembly further includes a basket extending from the inner side of the cover plate, and a support housing having an upper portion located adjacent the outer side of the cover plate and a lower portion extending through the aperture in the cover plate. The holding structure comprises an upper support member and a lower support member. The upper support member has a first slot defining a slot extending inwardly from an edge of the upper support member for receiving the C-stage ring of the cover plate. The first slot has an interior cross sectional dimension less than an outer cross sectional dimension of the cover plate and greater than an outer cross sectional dimension of the C-stage ring of the cover plate. The upper support member defines an upper surface adapted to engage the inner side of the cover plate to support the cover plate assembly on the holding structure. The lower support member is vertically spaced from the upper support member by at least one support bar. The lower support member has an upper surface facing an end of the cover plate assembly basket distal from the inner side of the cover plate when the cover plate assembly is supported on the upper support member.

In accordance with a second aspect of the present invention, a method for servicing a turbine engine cover plate assembly is provided. The cover plate assembly comprises a cover plate having an inner side, an outer side, a C-stage ring extending from the inner side and a central aperture extending between the inner and outer sides. The cover plate assembly further includes a basket extending from the inner side of the cover plate, and a support housing having an upper portion located adjacent the outer side of the cover plate and a lower portion extending through the aperture in the cover plate. The method comprises providing a holding structure associated with a lifting device, removing the cover plate assembly from the engine, disposing the cover plate assembly onto the holding structure, and performing a service operation on the cover plate assembly. The holding structure comprises an upper support member defining an upper surface and having a first slot defining a slot extending inwardly from an edge of the upper support member for receiving the C-stage ring of the cover plate. The lifting device is employed to dispose the cover plate assembly onto the holding structure by moving the C-stage ring of the cover plate into the first slot of the upper support member of the holding structure such that the inner surface of the cover plate engages the upper surface of the upper support member to support the cover plate assembly on the holding structure. The first slot has an interior cross sectional dimension less than an outer cross sectional dimension of the cover plate and greater than an outer cross sectional dimension of the C-stage ring of the cover plate.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
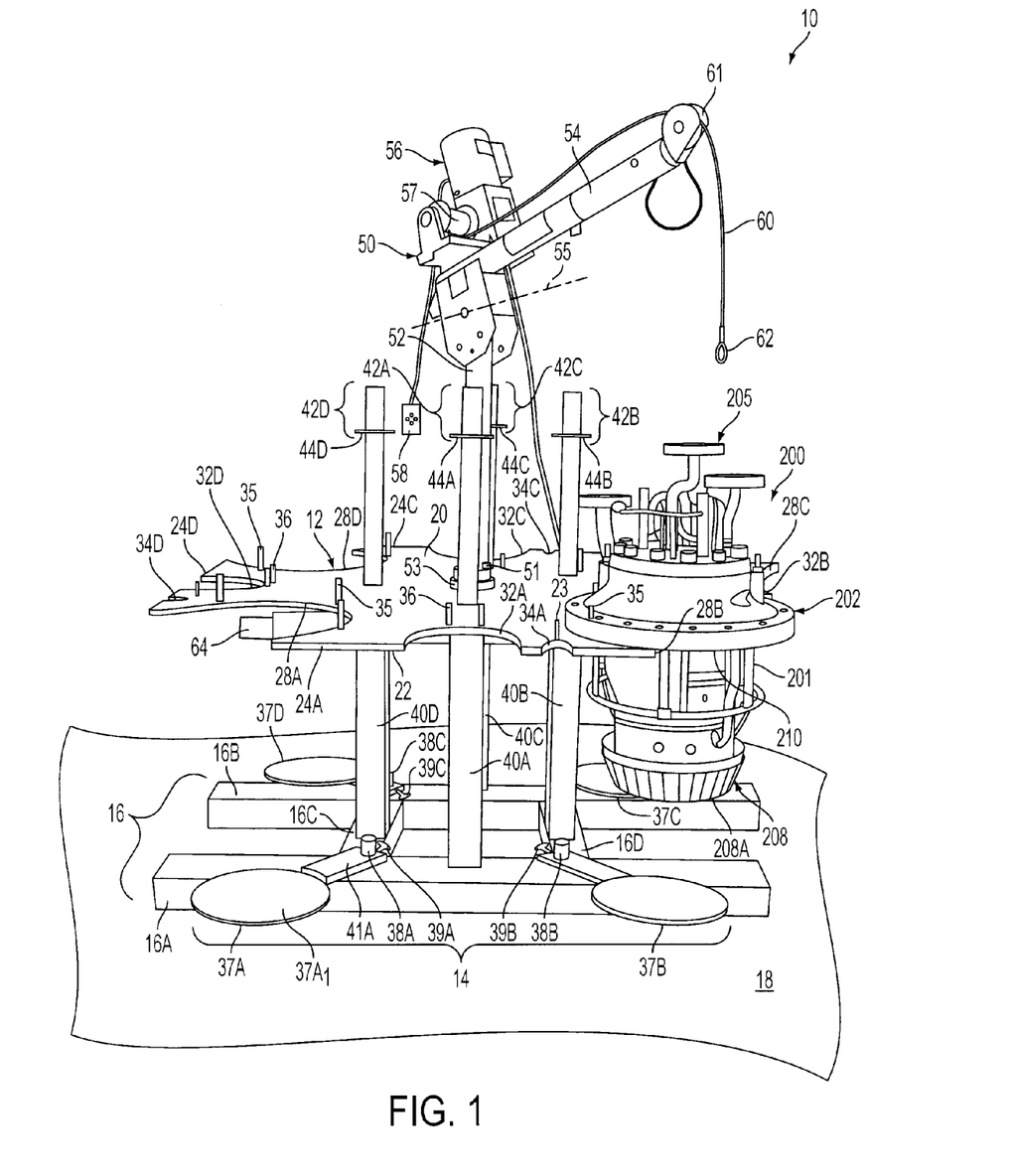
FIG. 1 is a perspective view of a holding structure having an associated lifting device and supporting a combustion turbine engine cover plate assembly in accordance with an embodiment of the invention.

Referring to FIG. 1, a holding structure 10 is shown for supporting a combustion turbine engine cover plate assembly 200, which will be described in detail below. The holding structure 10 is formed from a high strength material, such as, for example, stainless steel, and, in this embodiment, is capable of supporting up to four cover plate assemblies 200. The holding structure 10 comprises an upper support member 12 and a vertically spaced lower support member 14. A base portion 16 of the holding structure 10 is disposed between the lower support member 14 and a surface 18, i.e., the ground, on which the holding structure 10 stands for maintaining the holding structure 10 in an upright position. In the embodiment shown, the base portion 16 comprises two spaced apart and substantially parallel base members 16A, 16B and two spaced apart and substantially parallel connecting members 16C, 16D, but any suitable type of base portion 16 capable of maintaining the holding structure 10 in an upright position may be provided.

Figure 1A:
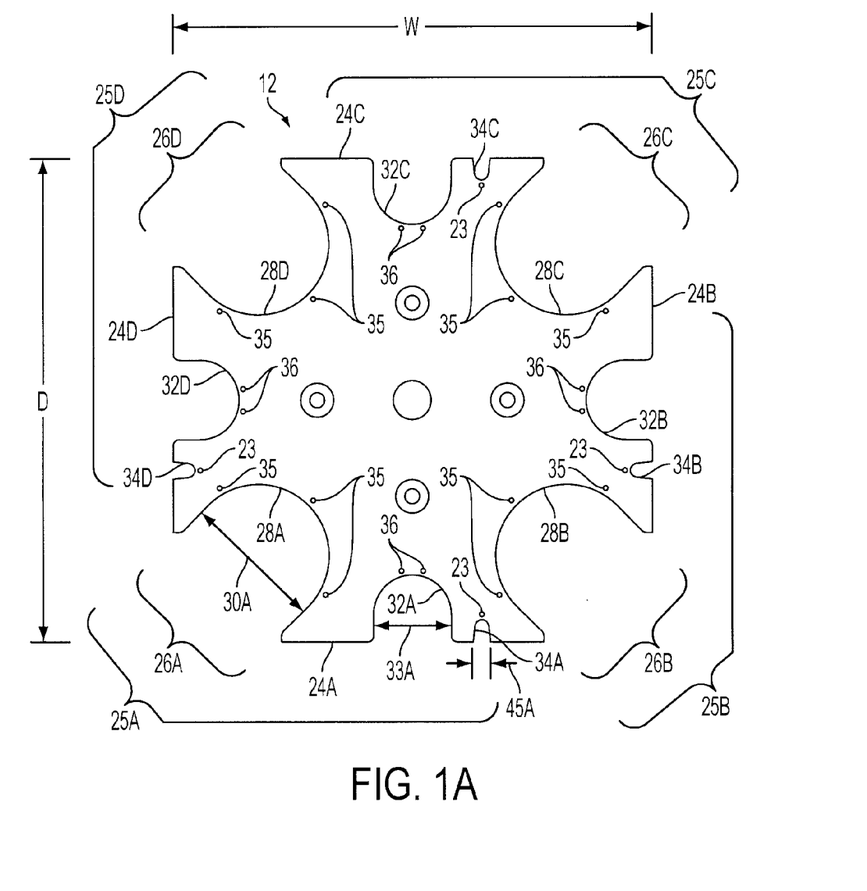
FIG. 1A is a plan view of an upper support member for the holding structure illustrated in FIG. 1.

The upper support member 12 has an upper surface 20 and an opposed lower surface 22, as shown in FIG. 1, and is substantially polygonal in shape, although the upper support member 12 may have any suitable shape. Referring to FIG. 1A, an outer periphery of the upper and lower surfaces 20, 22 is defined by four edges 24A, 24B, 24C, 24D defining a width dimension W of approximately 70 inches and a depth dimension D of approximately 70 inches, although the upper support member 12 may be any suitable dimension. The edges 24A-D are oriented with adjacent edges 24A-D substantially orthogonal to each other, and defining corners 26A, 26B, 26C, 26D at intersections thereof.

As shown in FIG. 1A, each corner 26A-D and a respective adjacent edge 24A-D define a service area 25A, 25B, 25C, 25D of the upper support member 12 for receiving one or more components of the cover plate assembly 200 during a servicing operation. Each service area 25A-D includes a first slot 28A, 28B, 28C, 28D located at each of a respective one of the corners 26A-D, and defined by an open cut-out portion extending inwardly from the edges 24A-D toward the center of the upper support member 12. Each service area 25A-D further comprises a respective second slot 32A, 32B, 32C, 32D and third slot 34A, 34B, 34C, 34D. The second slots 32A-D and third slots 34A-D are each defined by an open cut-out portion extending inwardly from the edges 24A-D. It is understood that the second slots 32A-D and third slots 34A-D shown in FIGS. 1, 1A, 5, 6, and 7 are illustrated in exemplary locations, and that the second slots 32A-D and the third slots 34A-D may be located anywhere within their respective service areas 25A-D.

The first slots 28A-D, second slots 32A-D, and third slots 34A-D each comprise a shape defined by a sector or portion of a circle and are configured to receive and support predetermined sections of the cover plate assembly 200 during a servicing operation. In particular, referring to FIGS. 1A and 3, the first slots 28A-D have a maximum interior cross-sectional dimension 30A of approximately twenty-one inches and are adapted to receive a C-stage ring 201 and support a cover plate 202 of the cover plate assembly 200, the second slots 32A-D have a maximum interior cross-sectional dimension, 33A of approximately eleven inches and are adapted to receive and support a support housing 204 or fuel nozzle of the cover plate assembly 200, and the third slots 34A-D have a maximum interior cross-sectional dimension, 45A of approximately two inches and are adapted to receive a pilot nozzle 205 of the cover plate assembly 200.

Referring to FIGS. 1 and 1A, cover plate alignment pins 35 extend vertically upwardly from the upper support member outer surface 20 adjacent to each of the first slots 28A-D. In the embodiment shown, three cover plate alignment pins 35 are provided adjacent to each of the first slots 28A-D, but additional or fewer cover plate alignment pins 35 may be used. The cover plate alignment pins 35 extend about three inches from the upper surface 20 of the upper support member 12 and are suitably sized to be received in apertures 206 (see FIG. 5) formed in the cover plate 202 of the cover plate assembly 200 to maintain the cover plate assembly 200 in a desired position.

Referring to FIGS. 1 and 1A, support housing alignment pins 36 adjacent to each of the second slots 32A-D extend vertically upwardly from the upper support member outer surface 20. In the embodiment shown, two support housing alignment pins 36 are provided adjacent to each of second slots 32A-D, but additional or fewer support housing alignment pins 36 may be used. The support housing alignment pins 36 extend about 2.25 inches from the upper surface 20 of the upper support member 12 and are suitably sized to be received in apertures 207 (see FIG. 6) formed in the support housing 204 of the cover plate assembly 200 to maintain the support housing 204 in a desired position.

Pilot nozzle alignment pins 23 associated with the third slots 34A, 34B, 34C, 34D extend vertically upwardly from the upper support member outer surface 20, as shown in FIG. 1. In the embodiment shown, one pilot nozzle alignment pin 23 is associated with each of the third slots 34A, 34B, 34C, 34D, but additional pilot nozzle alignment pins 23 may be used. The pilot nozzle alignment pins 23 extend about two inches from the upper surface 20 of the upper support member 12 and are suitably sized to be received in an aperture 265 (FIG. 6) formed in a mounting flange of the pilot nozzle 205 of the cover plate assembly 200 to maintain the pilot nozzle 205 in a desired position.

Referring to FIG. 1, the lower support member 14 comprises four substantially circular sections 37A, 37B, 37C, 37D, where each of the sections 37A-D correspond to a respective one of the service areas 25A-D of the upper support member 12. The sections 37A-D are provided for supporting a basket 208 (FIGS. 5 and 6) removed from the cover plate assembly 200 supported on the upper support member 12. All of the sections 37A-D are substantially similar and will be described with reference to one of the sections, identified as 37A. The section 37A is supported on an arm 41A and includes a planar upper surface 37A$_1$ that faces and is adapted to support the basket 208 of the cover plate assembly 200. The section 37A has an outer cross sectional dimension sufficiently sized to support a generally planar end 208A of the basket 208. In particular, the section 37A is generally circular and has a diameter greater than the diameter of the basket end 208A.

The section 37A is supported for pivotal movement relative to the base portion 16 at an axial support member 38A extending vertically upwardly about four inches from the base portion 16 and passing through the arm 41A. The section 37A may be pivoted about the axial support member 38A to a plurality of positions including a first, use position, shown in FIG. 1, where the section 37A is vertically aligned with the first slot 28A, and a second, storage position, shown in FIG. 7, where the section 37A is pivoted inwardly toward the base portion 16. The section 37A may be retained or locked in the first and second positions, as well as any other predefined positions, by a locking structure 39A supported on the arm 41A. Any suitable type of locking structure may be used, such as a weld-in quick release pin sold as part number 91712A351 offered commercially for sale by McMaster-Carr Supply Company of Elmhurst, Ill. In an embodiment incorporating such a quick release pin structure, the axial support member 38A may include a plurality of apertures (not shown) for receiving a horizontally movable locking pin of the locking structure 39A to lock the section 37A in each of the plurality of predefined positions.

Referring to FIG. 1, a plurality of support bars 40A, 40B, 40C, 40D extend vertically between the upper support member 12 and the base portion 16 and space the upper support member 12 a predetermined distance from the base portion 16 and the lower support member 14. In the embodiment shown, the spacing between the base portion 16 and the upper support member 12 is about 30 inches but may be any suitable distance. The support bars 40A-D extend through the upper support member 12 and vertically upwardly about 29 inches from the upper surface 20 of the upper support member 12. It is noted that the portions of the support bars 40A-D that extend between the upper support member 12 and the base portion 16 may be formed integrally with or separately from the portions of the support bars 40A-D that extend vertically upwardly from the upper support member 12.

Figure 7:
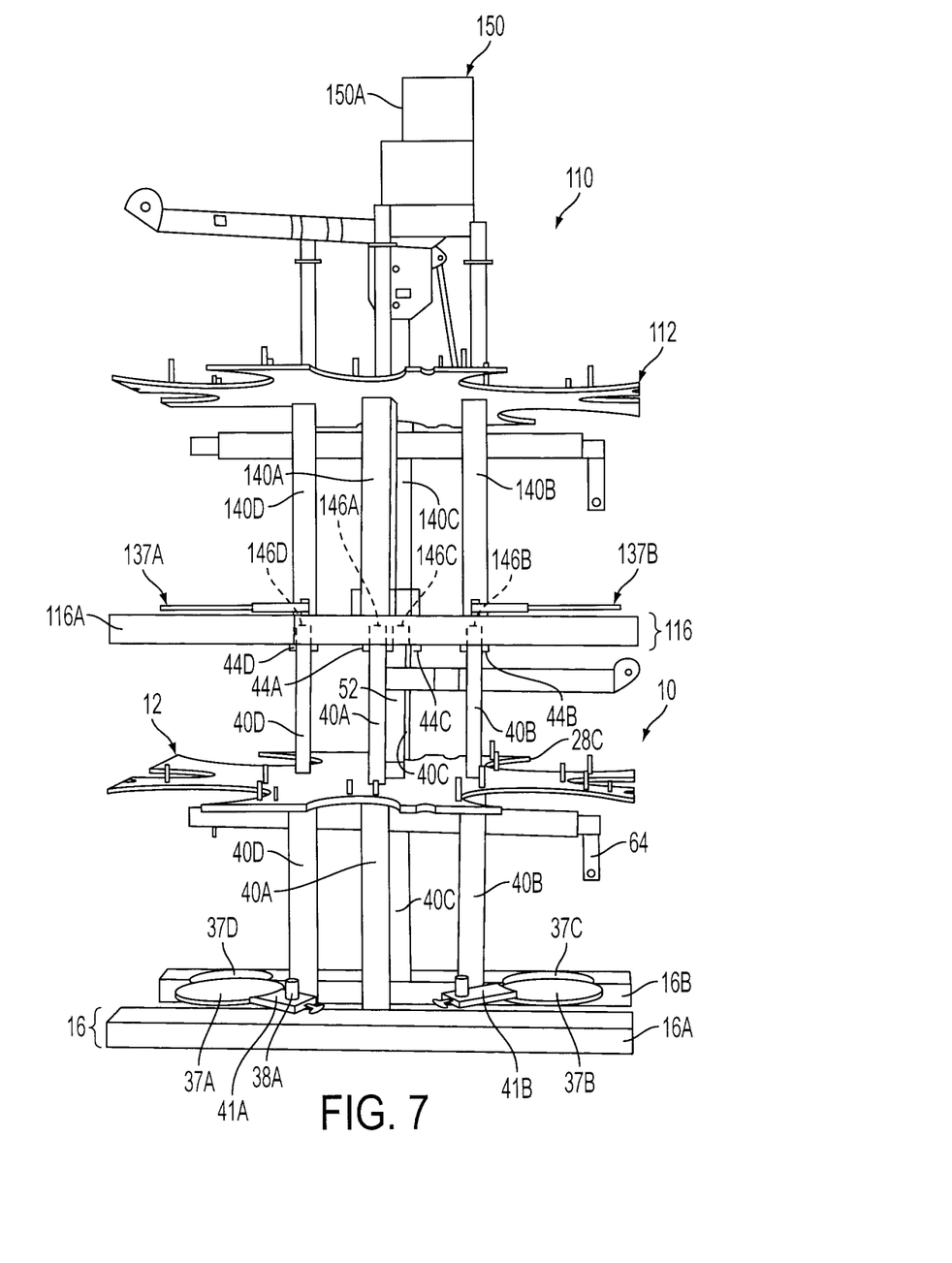
FIG. 7 is a front view of the holding structure illustrated in FIG. 1 stacked with a second holding structure in accordance with an embodiment of the invention.

First end portions 42A, 42B, 42C, 42D of the support bars 40A-D each include stacking guide structure 44A, 44B, 44C, 44D for supporting a second holding structure 110 thereon, as shown in FIG. 7 and will be discussed in detail below. In the embodiment shown, the stacking guide structure 44A-D comprises discs that extend radially about the support bars 40A-D at a distance, such as about six inches, from upper ends of the support bars 40A-D.

It should be noted that, although four support bars 40A, 40B, 40C, 40D are shown in FIG. 1, additional or fewer support bars could be provided.

As shown in FIG. 1, a lifting device 50 is mounted to the holding structure 10 and extends vertically from the upper surface 20 of the upper support member 12. A crane base 53 for securing the lifting device 50 on the holding structure 10 is affixed to the upper support member 12 of the holding structure 10, such as, for example, by welding. A plurality of securing members 51, e.g., pins, may be used to support the lifting device 50 on an upper surface of the crane base 53 such that the lifting device 50 is rotatable about the crane base 53. In the embodiment shown, the lifting device 50 is a power winch operated 5123 model portable davit crane offered commercially for sale by Thern, Inc. of Winona, Minn., although it is understood that other suitable types of lifting devices could be provided. The lifting device 50 comprises a vertical extension member 52 and an adjustable length boom 54 supported for pivotal movement about a horizontal axis 55 to a plurality of predetermined angles. In the embodiment shown, the vertical extension member 52 is rotatable 360° about the crane base 53.

A power winch 56, i.e., an electrically operated winch, is located adjacent to an end of the boom 54 and includes a winch drum 57 for feeding out and retracting a load bearing or lifting cable 60. The lifting cable 60 is guided over a distal end of the boom 54 by a pulley 61. Operation of the power winch 56 may be controlled by a pendant controller 58 to cause the winch drum 57 to rotate for lowering or lifting a capturing member 62, e.g., a hook, at a distal end of the lifting cable 60.

One cover plate assembly 200 will now be described in detail for the purpose of describing the use of the holding structure 10 in relation to an operation of holding and partially disassembling the cover plate assembly 200. It should be understood that although dimensions of the elements of the cover plate assembly 200 relative to the holding structure 10 are provided with reference to the structure of the first service area 25A, the following description is equally applicable to the other service areas 25B-D in relation to the cover plate assembly 200.

Figure 2:
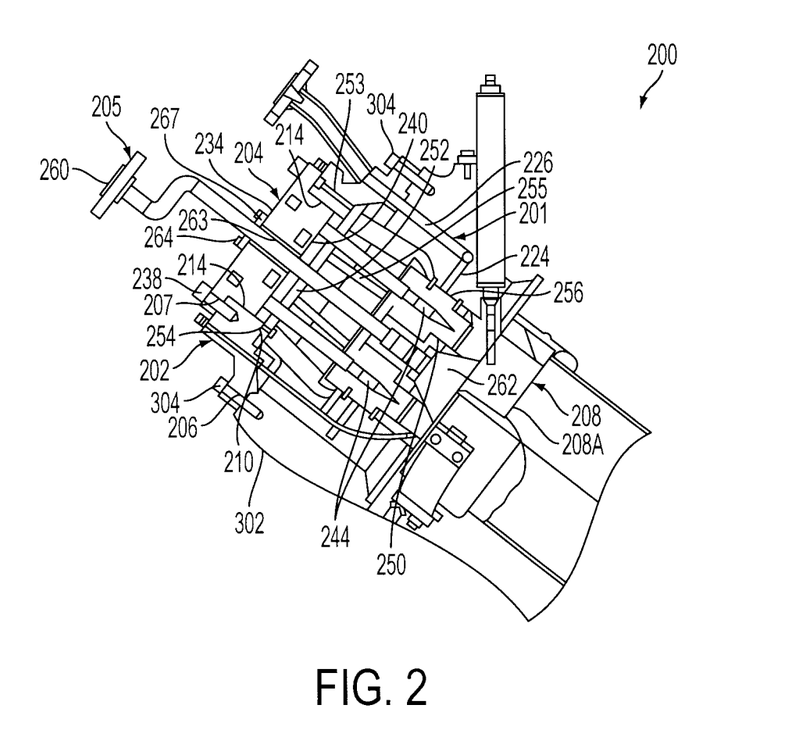
FIG. 2 is a radial cross sectional view of the combustion turbine engine cover plate assembly illustrated in FIG. 1, and shown mounted to a combustion cylinder of a turbine engine.

Referring now to FIG. 2, the cover plate assembly 200 is employed in a combustion turbine engine, such as a module W501 G engine of Siemens Power Generation, Inc. located in Orlando, Fla. The cover plate assembly 200 is mounted to a combustion cylinder 302 of the engine as shown in FIG. 2. It is noted that a typical combustion turbine engine may include a plurality of cover plate assemblies 200, and that 16 cover plate assemblies 200 may be employed in the combustion turbine engine according to this embodiment. Of these 16 cover plate assemblies 200, groups of four cover plate assemblies 200 are included in the same general area, such that the holding structure 10 is preferably capable of supporting four cover plate assemblies 200.

Figure 3:
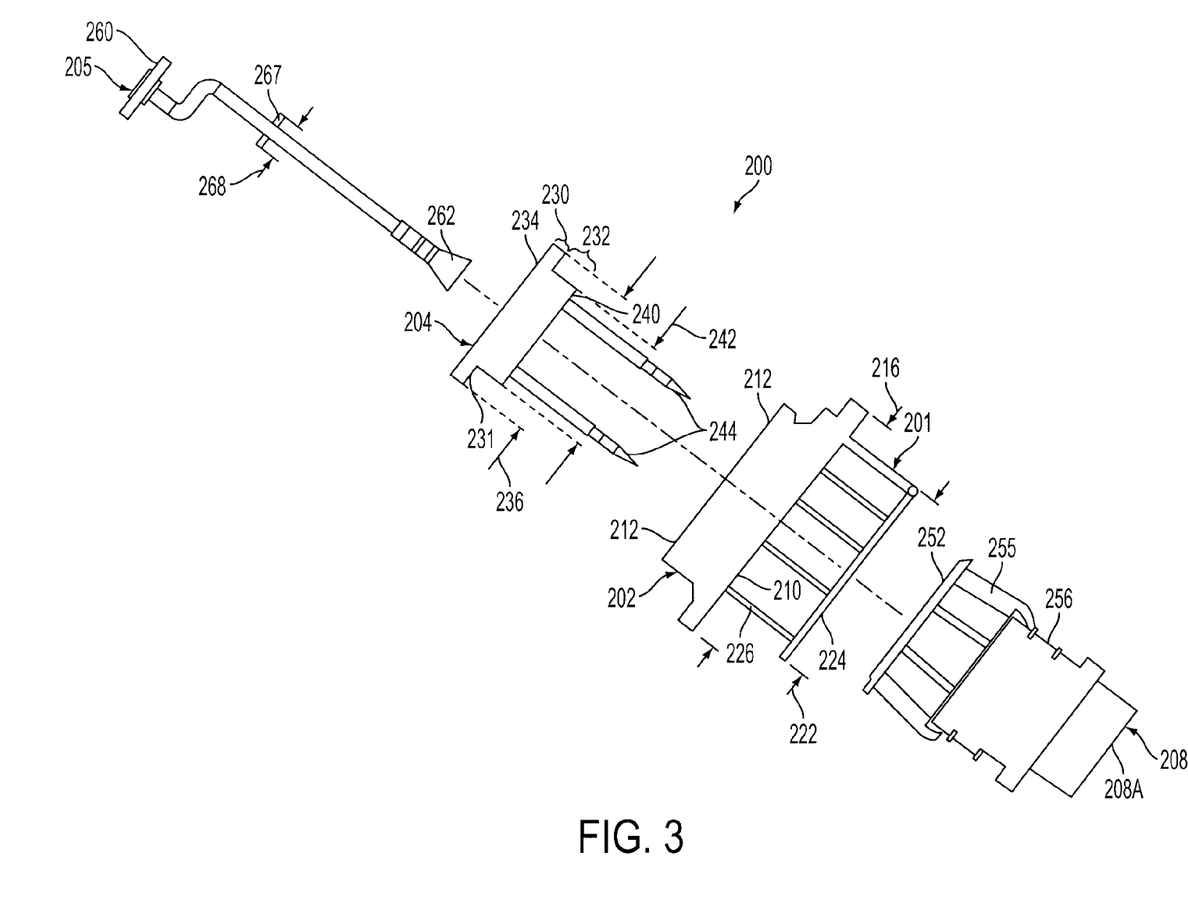
FIG. 3 is an exploded view showing the components of the combustion turbine engine cover plate assembly illustrated in FIG. 2.

Referring to FIGS. 2 and 3, the cover plate assembly 200 comprises the cover plate 202, the support housing 204, the pilot nozzle 205, and the basket 208. The cover plate 202 is affixed to the combustor cylinder 302 of the engine, such as with a plurality of bolts 304 (FIG. 2) and secures the cover plate assembly 200 in place in the engine. As mentioned above, the cover plate 202 includes a plurality of apertures 206 that receive the cover plate alignment pins 35 of the holding structure 10. Preferably, these same apertures 206 also receive the bolts 304 that attach the cover plate assembly 200 to the combustor cylinder 302, although separately formed apertures could also be used. The cover plate 202 includes an inner side 210, an outer side 212, and the C-stage ring 201, as is more clearly shown in FIG. 3. A central aperture 214 (FIG. 2) is formed in the cover plate 202 for receiving the support housing 204. The cover plate 202 is substantially cylindrical in shape and has an outer cross sectional dimension 216 (see FIG. 3) that is larger than the interior cross sectional dimension 30A of the first slot 28A of the upper support member 12. The inner side 210 defines a planar lower surface from which the C-stage ring 201 extends.

The C-stage ring 201 is substantially cylindrical in shape and has an outer cross sectional dimension 222 (see FIG. 3) that is less than the interior cross sectional dimension 30A of the first slot 28A of the upper support member 12. Accordingly, the C-stage ring 201 is sized such that it may be inserted into the first slot 28A. The C-stage ring 201 illustrated in FIGS. 2 and 3 comprises a circular ring member 224 that is spaced from the inner side 210 of the cover plate 202 via a plurality of connecting members 226, but may comprise other suitable known structures.

The support housing 204 comprises an upper portion 230 and a lower portion 232, as shown in FIG. 3. It is noted that the terms "upper" and "lower", when referring to the components of the cover plate assembly 200, refer to the positions of the components when supported on the holding structure 10. The support housing upper portion 230 comprises a disc shaped member having an outer surface 234 and an outer cross sectional dimension 236 (see FIG. 3) that is larger than the interior cross sectional dimension 33A of the second slot 32A of the upper support member 12. The support housing upper portion 230 defines a planar lower surface 231 that is adapted to abut the outer side 212 of the cover plate 202 when the support housing 204 is installed in the cover plate assembly 200, received in the central aperture 214 of the cover plate 202. Bolts 238 may be used to secure the support housing upper portion 230 to the cover plate 202, as shown in FIG. 2. As mentioned above, the support housing 204 includes a plurality of apertures 207 that receive the support housing alignment pins 36 of the holding structure 10. Preferably, these same apertures 207 also receive the bolts 238 that attach the support housing 204 to the cover plate 202, although separately formed apertures could also be used.

The support housing lower portion 232 comprises a disc shaped member having an inner surface 240 and an outer cross sectional dimension 242 (see FIG. 3) that is less than the interior cross sectional dimension 33A of the second slot 32A of the upper support member 12, see FIG. 1A. Accordingly, the support housing lower portion 232 is sized such that it may be inserted into the second slot 32A, as will be described in greater detail below. One or more main fuel nozzles 244 extend from the inner surface 240 of the support housing lower portion 232, as shown in FIGS. 2 and 3. The main fuel nozzles 244 are adapted to deliver fuel to the engine during various modes of operation, as is known in the art.

The pilot nozzle 205 comprises a tube shaped member having a fuel inlet 260 at one end and a fuel delivery structure 262 at a second end, as most clearly shown in FIG. 3. The fuel delivery structure 262 delivers fuel from the pilot nozzle 205 during various modes of engine operation as is known in the art. The pilot nozzle 205 is inserted through an aperture 263 formed in the support housing 204 and extends into a central aperture 250 of the basket 208. The pilot nozzle 205 may be secured to the support housing upper portion 230 using pilot nozzle bolts 264 (FIG. 2) passing through the apertures 265 (FIG. 6) in the mounting flange 267. As discussed above, the pilot nozzle 205 is sized to fit into the third slot 34A of the upper support member 12 to support the pilot nozzle 205 on the holding structure 10, see FIG. 1. In particular, the mounting flange 267 has an outer cross sectional dimension 268 that is greater than the interior cross sectional dimension 45A (FIG. 1A) of the third slot 34A, and the outer diameter of the pilot nozzle 205 is less than the dimension 45A of the third slot 34A, such that the upper surface 22 of the upper support member 12 engages the mounting flange 267 to support the pilot nozzle 205 on the holding structure 10.

The basket 208 extends from the inner side 210 of the cover plate 202, as shown in FIG. 2. In the embodiment shown, a basket ring member 252 of the basket 208 is mechanically fastened to the cover plate 202 with a plurality of basket bolts 253 that are inserted through apertures 254 (see also FIG. 6) formed in the basket ring member 252 and are affixed to the cover plate 202. Connecting structures 255 of the basket 208 attach the basket ring member 252 to a main body portion 256 of the basket 208 that is distal from the inner side 210 of the cover plate 202, as shown in FIG. 2. The main body portion 256 of the basket 208 includes the generally planar end 208A that may be supported on the lower support member 14 of the holding structure 10, as will be described in detail below.

Figure 4:
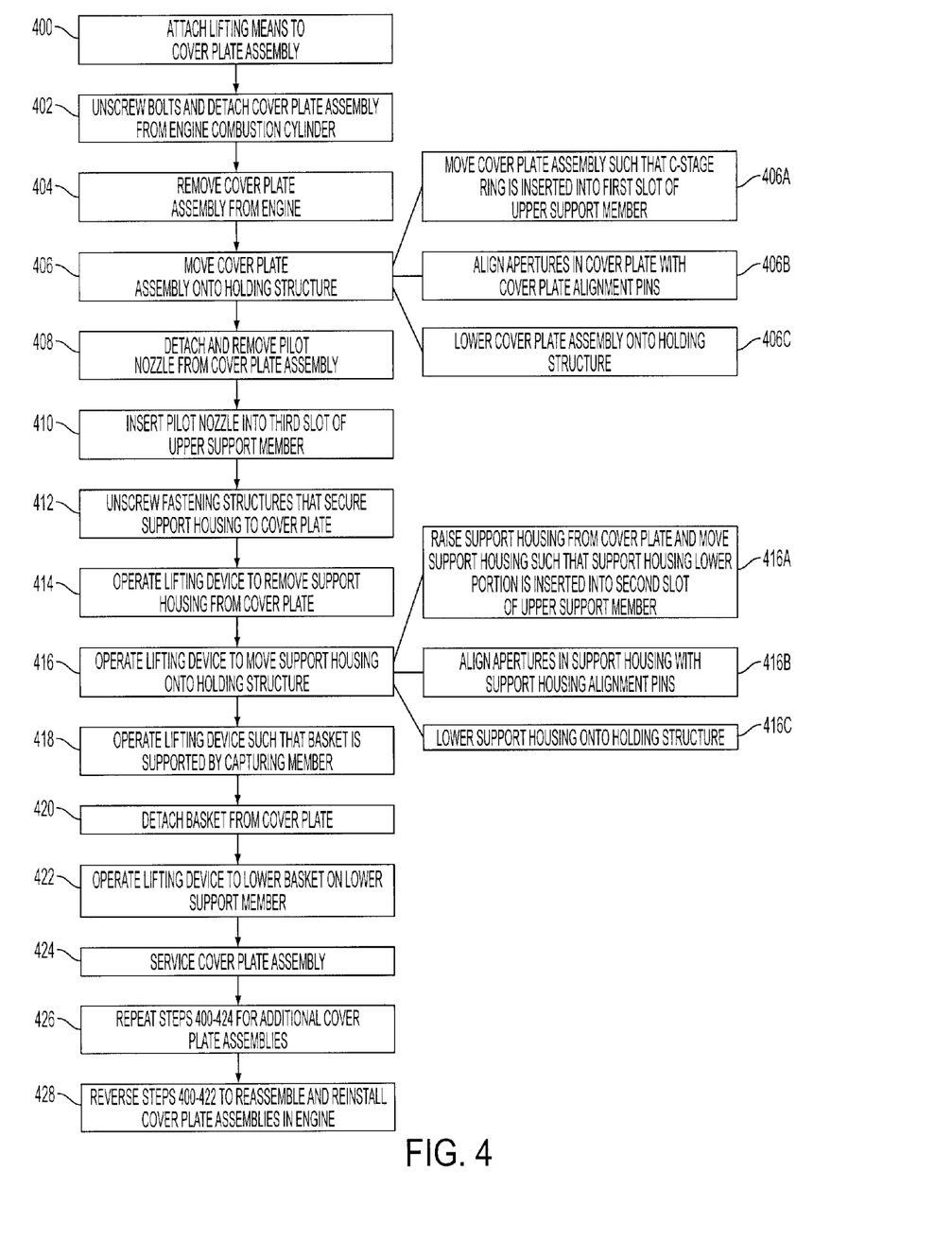
FIG. 4 is a flow chart showing steps for servicing the cover plate assembly according to an embodiment of the invention.

Referring to FIG. 4, a method for servicing the cover plate assembly 200 will now be described. Additional reference is made to FIGS. 1, 5, and 6, wherein use of the holding structure 10 is described with reference to the second service area 25B. A lifting means, which may comprise the lifting device 50 or other lifting structure, such as, for example, a mobile crane or an overhead crane, is attached to the cover plate assembly 200 at step 400. The bolts 304 are unscrewed and the cover plate assembly 200 is detached from the combustion cylinder 302 at step 402. The lifting means is then operated to remove the cover plate assembly 200 from the engine at step 404, i.e., the power winch 56 or a similar structure of the other lifting structure is operated to lift the cover plate assembly 200 away from the engine.

Once the cover plate assembly 200 is removed from the engine, the lifting means is operated to move the cover plate assembly 200 onto the holding structure 10 at step 406. Specifically, the cover plate assembly 200 is moved such that the C-stage ring 201 is inserted into the first slot 28B of the upper support member 12 at step 406A. The apertures 206 in the cover plate 202 are vertically aligned with the cover plate alignment pins 35 at step 406B. The cover plate assembly 200 is then lowered onto the holding structure 10 by the lifting device 50 at step 406C such that the planar lower surface of the inner side 210 of the cover plate 202 abuts and is supported by the upper surface 20 of the upper support member 12. As the cover plate assembly 200 is lowered onto the holding structure 10, the cover plate alignment pins 35 are received by the apertures 206 in the cover plate 202 such that the cover plate assembly 200 is supported in a fixed position on the holding structure 10, as shown in FIG. 1.

The pilot nozzle 205 may be detached from the cover plate assembly 200 by unscrewing the pilot nozzle bolts 264 and removed from the cover plate assembly 200 at step 408. The pilot nozzle 205 is inserted into the third slot 34B of the upper support member 12 and supported on the holding structure 10 at step 410.

Figure 5:
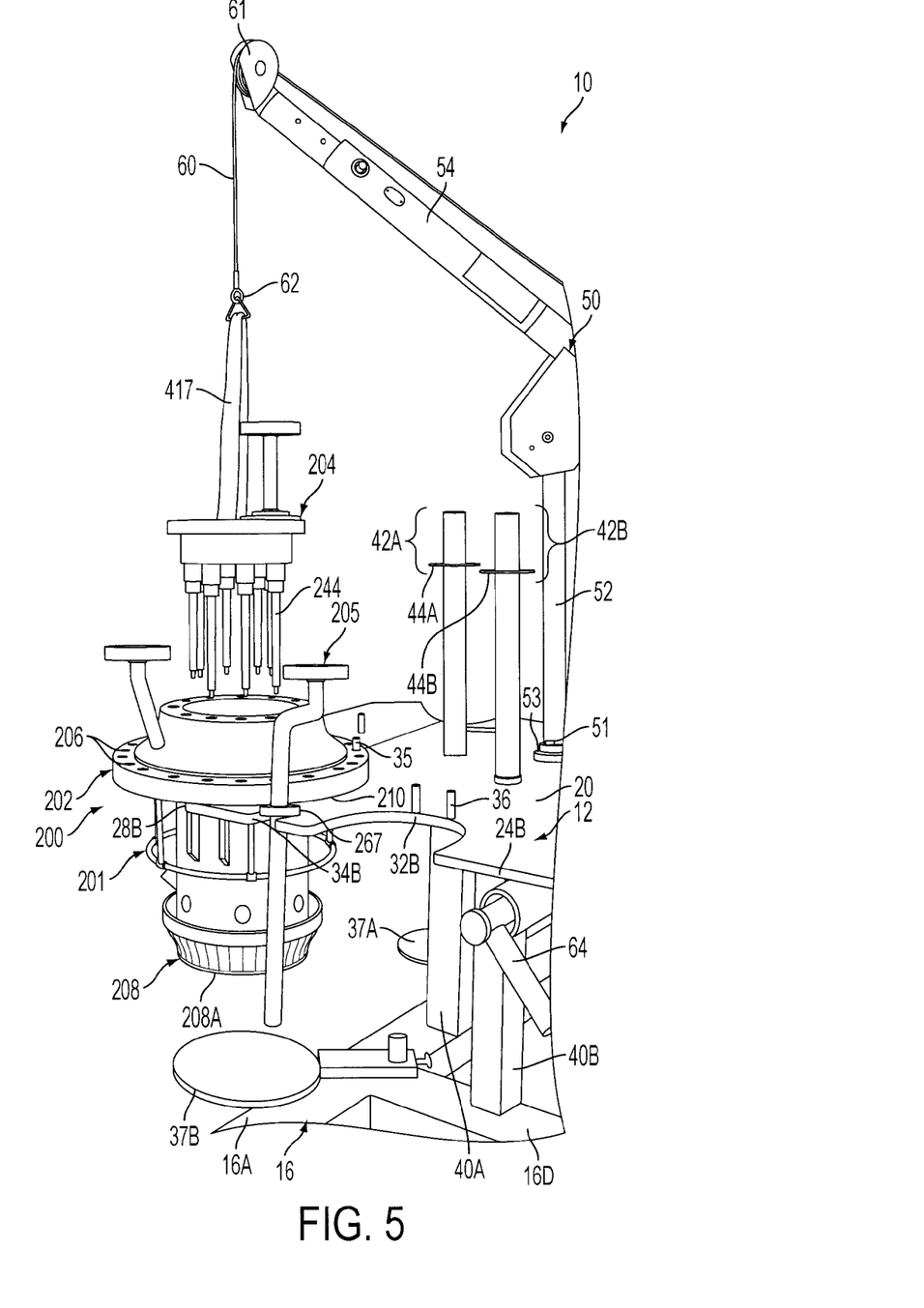
FIG. 5 is a perspective view of the cover plate assembly of FIG. 2 being supported on the holding structure illustrated in FIG. 1, wherein a support housing of the cover plate assembly is being manipulated by the lifting device.

Thereafter, the bolts 238 securing the support housing 204 to the cover plate 202 may be unscrewed at step 412. The lifting device 50 is then operated to remove the support housing 204 from the cover plate 202 at step 414, as illustrated in FIG. 5.

Figure 6:
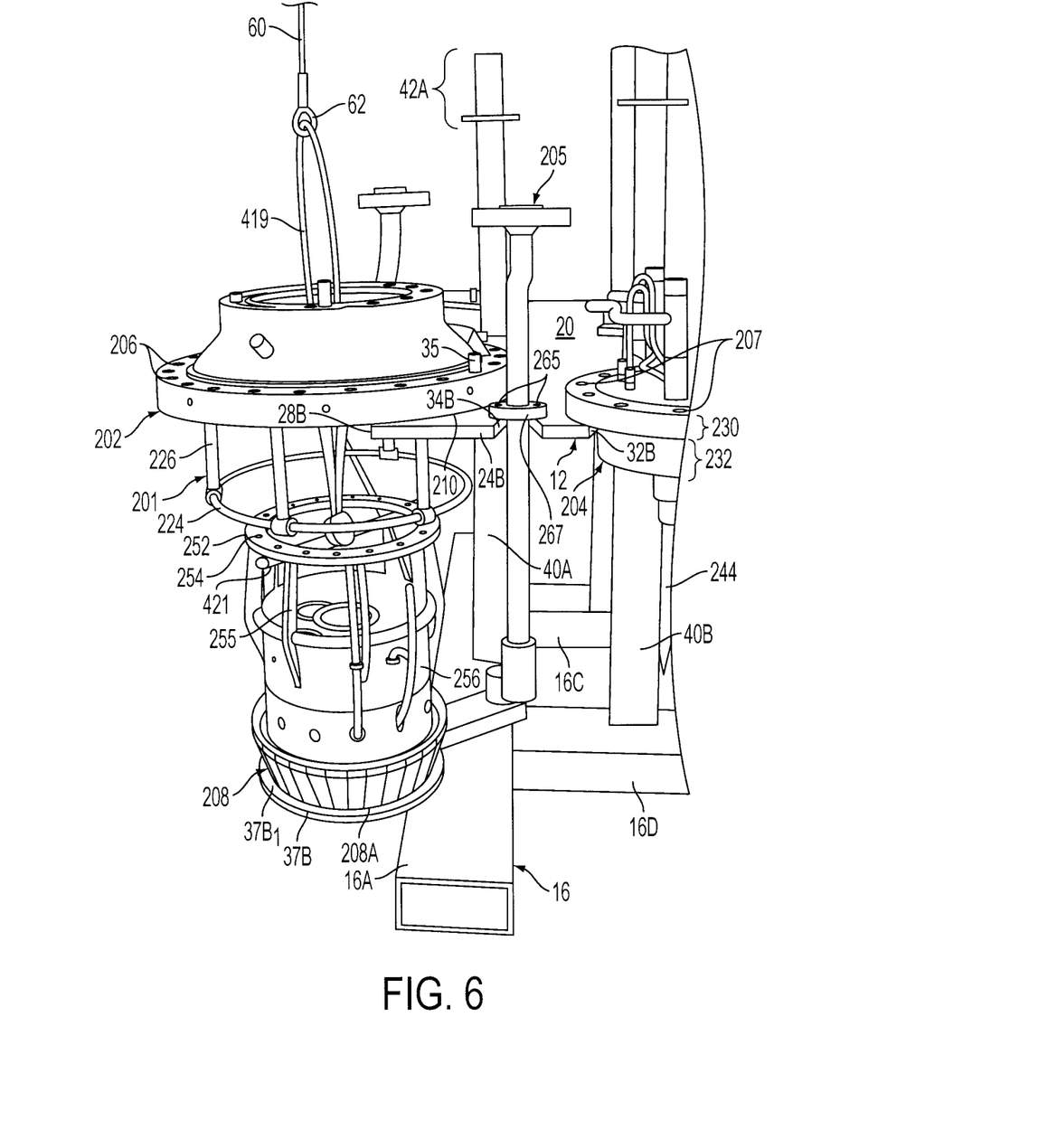
FIG. 6 is a perspective view of the cover plate assembly of FIG. 2 being supported on the holding structure illustrated in FIG. 1, wherein a basket of the cover plate assembly is being manipulated by the lifting device.

Once the support housing 204 is removed from the cover plate 202, the lifting device 50 is operated to move the support housing 204 onto the holding structure 10 at step 416. Specifically, the support housing 204 is raised from the cover plate 202 and then moved such that the support housing lower portion 232 is inserted into the second slot 32B of the upper support member 12 at step 416A. Optionally, the capturing member 62 may be affixed to an intermediate sustaining structure 417 e.g., a strap (see FIG. 5) that extends from the capturing member 62 and is temporarily attached to the support housing 204. The intermediate sustaining structure 417 may provide stability to the support housing 204 while the support housing 204 is being supported by the lifting device 50, i.e., such that the weight of the support housing 204 does not cause the support housing 204 to tip and/or slide on the capturing member 62. The apertures 207 in the support housing 204 are vertically aligned with the support housing alignment pins 36 at step 416B. The support housing 204 is then lowered onto the holding structure 10 by the lifting device 50 at step 416C such that the planar lower surface 231 of the upper portion 230 of the support housing 204 abuts and is supported by the upper surface 20 of the upper support member 12. As the support housing 204 is lowered onto the holding structure 10, the support housing alignment pins 36 are received by the apertures 207 in the support housing 204 such that the support housing 204 is supported in a fixed position on the holding structure 10, as shown in FIG. 6.

The lifting device 50 may then be operated such that the basket 208 is supported by the capturing member 62 at step 418. For example, the capturing member 62 may support an intermediate supporting structure 419 e.g., a rope (see FIG. 6) that is affixed to and extends from the capturing member 62. The intermediate supporting structure 419 may extend through the central aperture 214 in the cover plate and be attached to a basket supporting structure 421, e.g. a horizontally positioned bar (see FIG. 6) that is located to span across and engage the underside of the basket ring member 252 on diametrically opposed sides of the basket ring member 252. The intermediate supporting structure 419 and the basket supporting structure 421 may provide stability to the basket 208 while the basket 208 is being supported by the lifting device 50, i.e., such that the weight of the basket 208 does not cause the basket 208 to tip and/or slide on the capturing member 62. After taking any slack out of the load bearing cable 60 to ensure that the basket 208 will not drop when detached, the basket 208 is then detached from the cover plate 202 by removing the basket bolts 253 at step 420. The lifting device 50 is operated to lower the basket 208 such that the planar end 208A of the basket 208 is supported on the planar upper surface $37B_1$ of the lower support member 14, which has been previously vertically aligned with the first slot 28A, at step 422, as shown in FIG. 6.

Any one or more of the components of the cover plate assembly 200 can be serviced at step 424 during various times once the cover plate assembly 200 is supported on the holding structure 10. For example, once the cover plate assembly 200 is supported on the holding structure at step 406, the cover plate assembly 200 may be serviced e.g., inspected, repaired, or replaced. As another example, once the support housing 204 is supported on the holding structure 10 at step 416, the support housing 204 may be serviced e.g., inspected, repaired, or replaced. As yet another example, once the basket 208 is lowered onto the lower support member 14 of the holding structure 10 at step 422, the basket 208 may be serviced e.g., inspected, repaired, or replaced If desired, steps 400-424 can be repeated as necessary at step 426 to remove and position additional cover plate assemblies 200 in any of the service areas 25A-D that are empty in order to perform a service on any additional cover plate assemblies 200, wherein up to three additional cover plate assemblies can be supported on the holding structure 10. Hence, the service areas 25A-D are provided with structure specifically configured to effect servicing of the components of each cover plate assembly 200. In particular, the first, second, and third slots 28A-D, 32A-D, and 34A-D for each of the service areas 25A-D are configured to receive and maintain in position the disassembled components of the cover plate assemblies 200. Further, the lifting device 50 is provided as a mounted component of the holding structure 10 to facilitate movement of the cover plate assemblies 200 onto the holding structure 10, as well as to transfer components of the cover plate assemblies 200 within the service areas 25A-D.

Once the desired services are performed, the cover plate assemblies may be reassembled and reinstalled into the engine by employing appropriate ones of the steps 400 to 422 in reverse order for each of the serviced cover plate assemblies at step 428.

The holding structure 10 is capable of removing and supporting up to four cover plate assemblies 200, which each weigh approximately 500 pounds and can be otherwise difficult to remove and support. Specifically, use of the lifting device 50 to remove the cover plate assembly 200 and the components thereof reduces physical demand on technicians over prior art methods for servicing cover plate assemblies 200 that require manual lifting of the cover plate assembly 200 and/or the components thereof. Further, servicing of the cover plate assembly 200 using the holding structure 10 can be performed by a single technician, as opposed to prior art methods of servicing that require two or more technicians. For example, the pins 23, 35, 36, maintain their respective components stationary during servicing of the components, such as to prevent the components from rotating in their respective slots. Additionally, the support of the cover plate assemblies 200 provided by the holding structure 10 is believed to increase safety by reducing accidents, decrease servicing time, and decrease damage to the cover plate assembly 200 during servicing, as the cover plate assembly 200 can be safely and securing held in place by the holding structure 10.

FIG. 7 illustrates the holding structure 10 stacked with a similar second holding structure 110 in accordance with an optional embodiment of the invention. It is noted that structure of the second holding structure 110 corresponding to that of the holding structure 10 includes the same reference numerals increased by 100.

To stack the second holding structure 110 on the holding structure 10, the securing members 51 attaching the lifting device 50 to the holding structure 10 can be removed and the lifting device 50 can be removed and/or the lifting device may be repositioned so that the lifting device 50 will not interfere with stacking the second holding structure 110 on the holding structure 10. Further, the sections 37A-D may be rotated on their respective axial support members 38A to the transport and storage position shown in FIG. 7. It is noted that two of the sections 37A, 37B, 37C, 37D may be positioned slightly vertically higher than two others of the sections 37A, 37B, 37C, 37D such that the sections 37A-D may be vertically overlapped as shown in FIG. 7.

Thereafter, the second holding structure 110 is positioned over the holding structure 10 and lowered such that apertures 146A, 146B, 146C, 146D formed in a base portion 116 of the second holding structure 110 receive the first end portions 42A, 42B, 42C, 42D (FIG. 1) of the support bars 40A, 40B, 40C, 40D of the holding structure 10. The second holding structure 110 is lowered until the stacking guide structure 44A, 44B, 44C, 44D of the holding structure 10 abut the base portion 116 of the second holding structure 110 surrounding the apertures 146A-D. It is understood that the apertures 146A-D of the second holding structure 110 may be formed in the base portion 116. Alternately, the apertures 146A-D may comprise hollow end portions of support bars 140A, 140B, 140C, 140D of the second holding structure 110 that extend through or are affixed to the base portion 116.

It is noted that part of the lifting device 50 of the holding structure 10, and preferably at least the power winch 56, may extend through a space formed between base members (only base member 116A shown in FIG. 7) and connecting members (not shown) of the base portion 116 of the second holding structure 110 as shown in FIG. 7. It is also noted that the vertical extension member 52 may be positionable in a plurality of positions, i.e., an upper position and a lower position, so that the crane 50 may be lowered from the operating position (FIG. 1) into a storage and transport position (FIG. 7). It is further noted that a lifting beam 64 (see FIG. 1) may be supported under the upper support member 12. The lifting beam 64 comprises an elongate and substantially rigid member having a length greater than the length of the vertical extension member 52 and being capable of supporting the weight of the lifting device 50. The lifting beam 64 may be removed from under the upper support member 12 and used to raise and lower the lifting device 50 from the operating position to the storage and transport position. For example, the lifting beam 64 may be positioned to extend vertically upwardly from the upper surface 20 of the upper support member 12, wherein the lifting beam 64 may act as a hoist to raise or lower the lifting device 50, i.e. by securing the capturing member 62 to an upper portion of the lifting beam 64 and operating the power winch 56 to raise or lower the lifting device 50 into the operating position or the storage and transport position.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for servicing a turbine engine cover plate assembly comprising a cover plate having an inner side, an outer side, a C-stage ring extending from the inner side and a central aperture extending between the inner and outer sides, the cover plate assembly further including a basket extending from the inner side of the cover plate, and a support housing having an upper portion located adjacent the outer side of the cover plate and a lower portion extending through the aperture in the cover plate, the method comprising:

providing a holding structure associated with a lifting device, the holding structure comprising an upper support member defining an upper surface and having a first slot defining a slot extending inwardly from an edge of the upper support member for receiving the C-stage ring of the cover plate;

removing the cover plate assembly from the engine;

disposing the cover plate assembly onto the holding structure by moving the C-stage ring of the cover plate into the first slot of the upper support member of the holding structure such that the inner surface of the cover plate engages the upper surface of the upper support member to support the cover plate assembly on the holding structure, wherein the first slot has an interior cross sectional dimension less than an outer cross sectional dimension of the cover plate and greater than an outer cross sectional dimension of the C-stage ring of the cover plate; and performing a service operation on the cover plate assembly.

2. The method according to claim 1, further comprising employing the lifting device to lower the basket onto the lower support member.

3. The method according to claim 1, further comprising employing the lifting device to remove the support housing from the cover plate assembly for performing the service operation after the cover plate assembly is disposed on the holding structure.

4. The method according to claim 3, further comprising, after the support housing is removed from the cover plate assembly, moving the support housing onto the holding structure such that a planar lower surface of the upper portion of the support housing engages the upper surface of the upper support member to support the support housing on the holding structure.

5. The method according to claim 4, wherein said moving the support housing onto the holding structure further comprises employing the lifting device to move the support housing into a second slot of the upper support member of the holding structure, wherein the second slot has an interior cross sectional dimension less than an outer cross sectional dimension of the upper portion of the support housing and greater than an outer cross sectional dimension of the lower portion of the support housing.

6. The method according to claim 5, further comprising removing a pilot nozzle from the cover plate assembly and moving the pilot nozzle onto the holding structure such that a mounting flange of the pilot nozzle engages the upper surface of the upper support member to support the pilot nozzle on the holding structure, wherein said moving the pilot nozzle onto the holding structure further comprises moving the pilot nozzle into a third slot of the upper support member of the holding structure, wherein the third slot has an interior cross sectional dimension less than an outer cross sectional dimension of the mounting flange of the pilot nozzle and greater than a diameter of the pilot nozzle.

7. The method according to claim 1, wherein said employing the lifting device to dispose the cover plate assembly onto the holding structure further comprises aligning alignment pins that extend vertically upwardly from the upper surface of the upper support member of the holding structure with corresponding apertures formed in the cover plate and lowering the cover plate assembly onto the holding structure such that the alignment pins are received in the apertures in the cover plate.

8. The method according to claim 1, further comprising removing at least one additional cover plate assembly from the engine and disposing the at least one additional cover plate assembly onto the holding structure by moving the C-stage ring of the cover plate of the at least one additional cover plate assembly into a second first slot of the upper support member of the holding structure such that the inner surface of the cover plate of the at least one additional cover plate assembly engages the upper surface of the upper support member to support the at least one additional cover plate assembly on the holding structure, wherein the second first slot has an interior cross sectional dimension less than an outer cross sectional dimension of the cover plate of the at least one additional cover plate assembly and greater than an outer cross sectional dimension of the C-stage ring of the cover plate of the at least one additional cover plate assembly.

* * * * *